(12) United States Patent
Ferris et al.

(10) Patent No.: US 10,657,466 B2
(45) Date of Patent: May 19, 2020

(54) BUILDING CUSTOM APPLIANCES IN A CLOUD-BASED NETWORK

(75) Inventors: James Michael Ferris, Cary, NC (US); Aaron Peter Darcy, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 761 days.

(21) Appl. No.: 12/128,787

(22) Filed: May 29, 2008

(65) Prior Publication Data

US 2009/0299920 A1 Dec. 3, 2009

(51) Int. Cl.
*G06Q 10/06* (2012.01)
*G06Q 30/02* (2012.01)

(52) U.S. Cl.
CPC ......... *G06Q 10/06* (2013.01); *G06Q 30/0283* (2013.01); *G06Q 30/0284* (2013.01)

(58) Field of Classification Search
CPC . G06Q 30/0283; G06Q 10/06; G06Q 30/0284
USPC .......................... 709/221, 224, 229; 705/7.35
See application file for complete search history.

(56) References Cited

U.S. PATENT DOCUMENTS

| | | | |
|---|---|---|---|
| 5,664,206 A | 9/1997 | Murow et al. | |
| 6,367,077 B1 | 4/2002 | Brodersen et al. | |
| 6,393,569 B1 | 5/2002 | Orenshteyn | |
| 6,463,457 B1 | 10/2002 | Armentrout et al. | |
| 6,578,199 B1 | 6/2003 | Tsou et al. | |
| 6,915,278 B1 | 7/2005 | Ferrante et al. | |
| 7,140,028 B2 | 11/2006 | Bentley et al. | |
| 7,260,818 B1 | 8/2007 | Iterum et al. | |
| 7,313,796 B2 | 12/2007 | Hamilton et al. | |
| 7,392,546 B2 | 6/2008 | Patrick | |
| 7,439,937 B2 | 10/2008 | Ben-Shachar et al. | |
| 7,461,095 B2 | 12/2008 | Cohen et al. | |
| 7,487,494 B2 | 2/2009 | Chan et al. | |
| 7,509,416 B1 | 3/2009 | Edwardson et al. | |
| 7,529,785 B1 | 5/2009 | Spertus et al. | |
| 7,546,462 B2 | 6/2009 | Upton | |
| 7,577,722 B1 * | 8/2009 | Khandekar et al. | 709/220 |
| 7,596,620 B1 | 9/2009 | Colton et al. | |
| 7,624,394 B1 | 11/2009 | Christopher, Jr. | |
| 7,743,001 B1 * | 6/2010 | Vermeulen et al. | G06Q 30/0283 705/400 |
| 7,747,730 B1 | 6/2010 | Harlow | |
| 7,793,288 B2 * | 9/2010 | Sameske | 718/1 |
| 7,886,038 B2 | 2/2011 | Ferris | |
| 7,891,012 B1 | 2/2011 | Kiel et al. | |
| 7,945,897 B1 | 5/2011 | Cook | |
| 7,996,648 B2 | 8/2011 | England et al. | |

(Continued)

OTHER PUBLICATIONS

"rBuilder and the rPath Appliance Platform", 2007 rPath, Inc., www.rpath.com, 3 pages.*

(Continued)

*Primary Examiner* — George Chen
(74) *Attorney, Agent, or Firm* — Lowenstein Sandler LLP

(57) ABSTRACT

A cloud management system can track the usage of the virtual machines in order to determine the fees associated with the user's subscription to the cloud computing environment. The usage can include the resources consumed to support the virtual machines and can include the utilization of the virtual machines by the user or third parties. The cloud management system can determine the fees charged to the user for utilizing the cloud computing environment based on the tracked usage.

21 Claims, 5 Drawing Sheets

(56) References Cited

U.S. PATENT DOCUMENTS

| | | |
|---|---|---|
| 8,074,201 B2 | 12/2011 | Ghercioiu et al. |
| 8,108,912 B2 | 1/2012 | Ferris |
| 8,176,094 B2 | 5/2012 | Friedman |
| 8,181,174 B2 | 5/2012 | Liu |
| 8,201,144 B2 | 6/2012 | Rogers et al. |
| 8,239,509 B2 | 8/2012 | Ferris et al. |
| 8,255,650 B1 | 8/2012 | Gruttadauria et al. |
| 8,458,658 B2 | 6/2013 | Ferris et al. |
| 8,504,433 B2 | 8/2013 | Ferris et al. |
| 8,504,443 B2 | 8/2013 | Ferris et al. |
| 8,606,795 B2 | 12/2013 | Morgana et al. |
| 8,949,426 B2 | 2/2015 | Morgan |
| 9,116,776 B2 | 8/2015 | Boggs et al. |
| 9,210,173 B2 | 12/2015 | Ferris |
| 2001/0039497 A1 | 11/2001 | Hubbard |
| 2001/0052108 A1 | 12/2001 | Bowman-Amuah |
| 2002/0029326 A1 | 3/2002 | Reuter et al. |
| 2002/0035604 A1 | 3/2002 | Cohen et al. |
| 2002/0069213 A1 | 6/2002 | Moslander et al. |
| 2002/0069276 A1 | 6/2002 | Hino et al. |
| 2002/0086688 A1 | 7/2002 | Kang |
| 2002/0112171 A1 | 8/2002 | Ginter et al. |
| 2002/0129352 A1 | 9/2002 | Brodersen et al. |
| 2002/0152372 A1* | 10/2002 | Cole et al. .................. 713/2 |
| 2002/0165819 A1 | 11/2002 | McKnight et al. |
| 2002/0188869 A1 | 12/2002 | Patrick |
| 2003/0023839 A1* | 1/2003 | Burkhardt et al. ............... 713/1 |
| 2003/0033612 A1* | 2/2003 | Schwalb .................. 725/140 |
| 2003/0037258 A1 | 2/2003 | Koren |
| 2003/0110252 A1 | 6/2003 | Yang-Huffman |
| 2003/0121024 A1 | 6/2003 | Hill et al. |
| 2003/0135609 A1 | 7/2003 | Carlson et al. |
| 2003/0160823 A1 | 8/2003 | Stannard |
| 2003/0167354 A1 | 9/2003 | Peppers et al. |
| 2003/0220835 A1 | 11/2003 | Barnes, Jr. |
| 2004/0044998 A1 | 3/2004 | Wildhagen et al. |
| 2004/0153703 A1 | 8/2004 | Vigue et al. |
| 2004/0162902 A1 | 8/2004 | Davis |
| 2004/0177342 A1 | 9/2004 | Worley, Jr. |
| 2004/0181773 A1 | 9/2004 | Mortensen et al. |
| 2004/0193953 A1 | 9/2004 | Callahan et al. |
| 2004/0199572 A1* | 10/2004 | Hunt et al. .................. 709/201 |
| 2004/0210591 A1 | 10/2004 | Hirschfeld et al. |
| 2004/0210627 A1 | 10/2004 | Kroening |
| 2004/0210893 A1 | 10/2004 | Chamberlain et al. |
| 2004/0268347 A1 | 12/2004 | Knauerhase et al. |
| 2005/0044541 A1 | 2/2005 | Parthasarathy et al. |
| 2005/0044546 A1 | 2/2005 | Niebling et al. |
| 2005/0071847 A1 | 3/2005 | Bentley et al. |
| 2005/0125513 A1 | 6/2005 | Sin-Ling Lam et al. |
| 2005/0131898 A1 | 6/2005 | Fatula |
| 2005/0144060 A1 | 6/2005 | Chen et al. |
| 2005/0149447 A1 | 7/2005 | Sherkow |
| 2005/0182727 A1 | 8/2005 | Robert et al. |
| 2005/0198628 A1 | 9/2005 | Graham et al. |
| 2005/0262549 A1 | 11/2005 | Ritt et al. |
| 2005/0273779 A1 | 12/2005 | Cheng et al. |
| 2005/0289508 A1 | 12/2005 | Illowsky et al. |
| 2005/0289540 A1 | 12/2005 | Nguyen et al. |
| 2006/0031598 A1* | 2/2006 | Blanchard et al. ............ 710/15 |
| 2006/0041881 A1 | 2/2006 | Adkasthala |
| 2006/0074880 A1 | 4/2006 | Bukary |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0101451 A1 | 5/2006 | Fong |
| 2006/0130144 A1 | 6/2006 | Wernicke |
| 2006/0146991 A1 | 7/2006 | Thompson et al. |
| 2006/0155735 A1 | 7/2006 | Traut et al. |
| 2006/0177058 A1 | 8/2006 | Sarwono et al. |
| 2006/0195832 A1* | 8/2006 | Chandley et al. ............ 717/168 |
| 2006/0218544 A1 | 9/2006 | Chakraborty et al. |
| 2006/0218547 A1 | 9/2006 | Purkeypile et al. |
| 2006/0224436 A1 | 10/2006 | Matsumoto et al. |
| 2006/0236228 A1 | 10/2006 | Michelstein et al. |
| 2006/0277542 A1 | 12/2006 | Wipfel |
| 2007/0011291 A1 | 1/2007 | Mi et al. |
| 2007/0028001 A1 | 2/2007 | Phillips et al. |
| 2007/0053513 A1 | 3/2007 | Hoffberg |
| 2007/0074201 A1 | 3/2007 | Lee |
| 2007/0078988 A1 | 4/2007 | Miloushev et al. |
| 2007/0101116 A1* | 5/2007 | Tsuji ................................. 713/1 |
| 2007/0105627 A1* | 5/2007 | Campbell ..................... 463/40 |
| 2007/0108627 A1 | 5/2007 | Kozaka et al. |
| 2007/0150865 A1 | 6/2007 | Rajput |
| 2007/0159650 A1 | 7/2007 | Takamatsu et al. |
| 2007/0168926 A1 | 7/2007 | Rajah et al. |
| 2007/0168962 A1 | 7/2007 | Heinke et al. |
| 2007/0169079 A1 | 7/2007 | Keller et al. |
| 2007/0226715 A1 | 9/2007 | Kimura et al. |
| 2007/0245332 A1 | 10/2007 | Tal et al. |
| 2007/0250672 A1 | 10/2007 | Stroberger et al. |
| 2007/0283282 A1* | 12/2007 | Bonfiglio et al. ............ 715/762 |
| 2007/0294314 A1 | 12/2007 | Padovano et al. |
| 2007/0294676 A1* | 12/2007 | Mellor et al. ................. 717/139 |
| 2008/0004904 A1 | 1/2008 | Tran |
| 2008/0022271 A1 | 1/2008 | D'Angelo et al. |
| 2008/0034364 A1 | 2/2008 | Lam et al. |
| 2008/0052384 A1 | 2/2008 | Mari et al. |
| 2008/0077605 A1 | 3/2008 | Vasu |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0086728 A1 | 4/2008 | Lam et al. |
| 2008/0091613 A1 | 4/2008 | Gates et al. |
| 2008/0104393 A1 | 5/2008 | Glasser et al. |
| 2008/0104608 A1 | 5/2008 | Hyser et al. |
| 2008/0109876 A1 | 5/2008 | Hitomi et al. |
| 2008/0127087 A1 | 5/2008 | Brookins et al. |
| 2008/0134178 A1 | 6/2008 | Fitzgerald et al. |
| 2008/0178144 A1 | 7/2008 | Bazigos et al. |
| 2008/0215796 A1 | 9/2008 | Lam et al. |
| 2008/0240150 A1 | 10/2008 | Dias et al. |
| 2008/0256516 A1 | 10/2008 | Chaar et al. |
| 2008/0263258 A1 | 10/2008 | Allwell et al. |
| 2009/0012885 A1 | 1/2009 | Cahn |
| 2009/0013061 A1* | 1/2009 | Winter et al. ................. 709/222 |
| 2009/0013309 A1 | 1/2009 | Shavlik |
| 2009/0025006 A1* | 1/2009 | Waldspurger ................. 718/104 |
| 2009/0037496 A1* | 2/2009 | Chong et al. ................. 707/204 |
| 2009/0064086 A1 | 3/2009 | Faus |
| 2009/0083734 A1 | 3/2009 | Hotra |
| 2009/0089078 A1* | 4/2009 | Bursey ................................. 705/1 |
| 2009/0089407 A1 | 4/2009 | Chalupa et al. |
| 2009/0089738 A1 | 4/2009 | Krueger et al. |
| 2009/0099940 A1 | 4/2009 | Frederick et al. |
| 2009/0103722 A1 | 4/2009 | Anderson et al. |
| 2009/0132695 A1 | 5/2009 | Surtani et al. |
| 2009/0144718 A1 | 6/2009 | Boggs |
| 2009/0177514 A1 | 7/2009 | Hudis et al. |
| 2009/0210527 A1 | 8/2009 | Kawato |
| 2009/0210869 A1 | 8/2009 | Gebhart et al. |
| 2009/0210875 A1 | 8/2009 | Bolles et al. |
| 2009/0217244 A1 | 8/2009 | Bozak et al. |
| 2009/0217255 A1 | 8/2009 | Troan |
| 2009/0217263 A1* | 8/2009 | Gebhart et al. .................. 718/1 |
| 2009/0217267 A1 | 8/2009 | Gebhart et al. |
| 2009/0222805 A1* | 9/2009 | Faus et al. ..................... 717/168 |
| 2009/0222806 A1 | 9/2009 | Faus |
| 2009/0222808 A1* | 9/2009 | Faus et al. ..................... 717/171 |
| 2009/0228950 A1 | 9/2009 | Reed et al. |
| 2009/0248693 A1* | 10/2009 | Sagar et al. ..................... 707/10 |
| 2009/0249279 A1 | 10/2009 | Bourdon |
| 2009/0249287 A1* | 10/2009 | Patrick ........................... 717/107 |
| 2009/0249488 A1 | 10/2009 | Robinson et al. |
| 2009/0260007 A1 | 10/2009 | Beaty et al. |
| 2009/0265707 A1 | 10/2009 | Goodman et al. |
| 2009/0265756 A1 | 10/2009 | Zhang et al. |
| 2009/0271324 A1 | 10/2009 | Jandhyala et al. |
| 2009/0276771 A1* | 11/2009 | Nickolov et al. ............. 717/177 |

(56) References Cited

U.S. PATENT DOCUMENTS

| | | | |
|---|---|---|---|
| 2009/0287691 A1* | 11/2009 | Sundaresan et al. | 707/5 |
| 2009/0293056 A1 | 11/2009 | Ferris | |
| 2009/0299905 A1* | 12/2009 | Mestha et al. | 705/76 |
| 2009/0299920 A1 | 12/2009 | Ferris et al. | |
| 2009/0300057 A1* | 12/2009 | Friedman | 707/102 |
| 2009/0300149 A1* | 12/2009 | Ferris et al. | 709/222 |
| 2009/0300151 A1* | 12/2009 | Friedman et al. | 709/222 |
| 2009/0300152 A1 | 12/2009 | Ferris | |
| 2009/0300164 A1 | 12/2009 | Boggs | |
| 2009/0300169 A1 | 12/2009 | Sagar et al. | |
| 2009/0300210 A1 | 12/2009 | Ferris | |
| 2009/0300423 A1 | 12/2009 | Ferris | |
| 2009/0300584 A1 | 12/2009 | Faus | |
| 2009/0300593 A1 | 12/2009 | Faus | |
| 2009/0300601 A1 | 12/2009 | Faus | |
| 2009/0300607 A1 | 12/2009 | Ferris et al. | |
| 2009/0300608 A1 | 12/2009 | Ferris et al. | |
| 2009/0300635 A1 | 12/2009 | Ferris | |
| 2009/0300641 A1 | 12/2009 | Friedman et al. | |
| 2009/0300719 A1 | 12/2009 | Ferris | |
| 2009/0327683 A1* | 12/2009 | Cabot et al. | 713/2 |
| 2010/0031234 A1 | 2/2010 | Chaar et al. | |
| 2010/0042720 A1 | 2/2010 | Stienhans et al. | |
| 2010/0049736 A1 | 2/2010 | Rolls et al. | |
| 2010/0050172 A1 | 2/2010 | Ferris | |
| 2010/0057831 A1 | 3/2010 | Williamson | |
| 2010/0058347 A1 | 3/2010 | Smith et al. | |
| 2010/0066677 A1* | 3/2010 | Garrett et al. | 345/163 |
| 2010/0095270 A1 | 4/2010 | Seitz et al. | |
| 2010/0131324 A1 | 5/2010 | Ferris | |
| 2010/0131590 A1 | 5/2010 | Coleman et al. | |
| 2010/0131624 A1 | 5/2010 | Ferris | |
| 2010/0131649 A1 | 5/2010 | Ferris | |
| 2010/0131948 A1 | 5/2010 | Ferris | |
| 2010/0131949 A1 | 5/2010 | Ferris | |
| 2010/0132016 A1 | 5/2010 | Ferris | |
| 2010/0169477 A1 | 7/2010 | Stienhans et al. | |
| 2010/0217850 A1 | 8/2010 | Ferris | |
| 2010/0217864 A1 | 8/2010 | Ferris | |
| 2010/0217865 A1 | 8/2010 | Ferris | |
| 2010/0218237 A1 | 8/2010 | Ferris | |
| 2010/0220622 A1 | 9/2010 | Wei | |
| 2010/0235482 A1 | 9/2010 | Chalupa et al. | |
| 2010/0235813 A1 | 9/2010 | Manczak et al. | |
| 2010/0299366 A1 | 11/2010 | Stienhans et al. | |
| 2010/0299514 A1* | 11/2010 | Samba et al. | 713/2 |
| 2010/0306354 A1 | 12/2010 | DeHaan | |
| 2010/0306377 A1 | 12/2010 | DeHaan | |
| 2010/0306379 A1 | 12/2010 | Ferris | |
| 2010/0306566 A1 | 12/2010 | DeHaan | |
| 2010/0306765 A1 | 12/2010 | DeHaan | |
| 2010/0306767 A1 | 12/2010 | DeHaan | |
| 2010/0306773 A1 | 12/2010 | Lee et al. | |
| 2011/0004676 A1 | 1/2011 | Kawato | |
| 2011/0010420 A1* | 1/2011 | Kagitani | 709/203 |
| 2011/0016214 A1 | 1/2011 | Jackson | |
| 2011/0035733 A1 | 2/2011 | Horning et al. | |
| 2011/0055034 A1 | 3/2011 | Ferris | |
| 2011/0055377 A1 | 3/2011 | DeHaan | |
| 2011/0055378 A1 | 3/2011 | Ferris | |
| 2011/0055396 A1 | 3/2011 | DeHaan | |
| 2011/0055398 A1 | 3/2011 | DeHaan | |
| 2011/0055588 A1 | 3/2011 | DeHaan | |
| 2011/0107103 A1 | 5/2011 | DeHaan | |
| 2011/0119651 A1 | 5/2011 | Utschig-Utschig et al. | |
| 2011/0131134 A1 | 6/2011 | Ferris | |
| 2011/0131306 A1 | 6/2011 | Ferris | |
| 2011/0131315 A1 | 6/2011 | Ferris | |
| 2011/0131316 A1 | 6/2011 | Ferris | |
| 2011/0131335 A1 | 6/2011 | Spaltro et al. | |
| 2011/0153697 A1 | 6/2011 | Nickolov et al. | |
| 2011/0167408 A1 | 7/2011 | Harmon | |
| 2011/0170837 A1 | 7/2011 | Barnes, Jr. | |
| 2011/0213686 A1 | 9/2011 | Ferris | |
| 2011/0213687 A1 | 9/2011 | Ferris | |
| 2011/0213691 A1 | 9/2011 | Ferris | |
| 2011/0213713 A1 | 9/2011 | Ferris | |
| 2011/0213719 A1 | 9/2011 | Ferris | |
| 2011/0213875 A1 | 9/2011 | Ferris | |
| 2011/0213884 A1 | 9/2011 | Ferris | |
| 2011/0214124 A1 | 9/2011 | Ferris | |
| 2011/0239190 A1 | 9/2011 | Mueller et al. | |
| 2011/0131499 A1 | 11/2011 | Ferris | |
| 2012/0131195 A1 | 5/2012 | Morgan | |
| 2012/0204171 A1 | 8/2012 | Reisman | |
| 2012/0246207 A1 | 9/2012 | Evans et al. | |
| 2012/0246639 A1 | 9/2012 | Kashyap et al. | |
| 2012/0260229 A1 | 10/2012 | Peraza et al. | |
| 2014/0096123 A1 | 4/2014 | Boggs et al. | |

OTHER PUBLICATIONS

White Paper—"rPath Versus Other Software Appliance Approaches", Mar. 2008, rPath, Inc., www.rpath.com, 9 pages.*

White Paper—"Best Practices for Building Virtuat Appliances" 2008 rPath, Inc., www.rpath.com, 6 pages.*

U.S. Appl. No. 12/040,831, "Methods and Systems for Dynamically Building a Software Appliance", filed Feb. 29, 2008, Norman Lee Faus et al.

Ferris et al., "Systems and Methods for Cross-Cloud Vendor Mapping Service in a Dynamic Cloud Marketplace", U.S. Appl. No. 12/790,229, filed May 28, 2010.

Ferris et al., "Systems and Methods for Aggregate Monitoring of Utilization Data for Vendor Products in Cloud Networks", U.S. Appl. No. 12/790,039, filed May 28, 2010.

DeHaan, "Methods and Systems for Abstracting Cloud Management", U.S. Appl. No. 12/474,113, filed May 28, 2009.

DeHaan et al., "Systems and Methods for Power Management in Managed Network Having Hardware-Based and Virtual Resources", U.S. Appl. No. 12/475,448, filed May 29, 2009.

Ferris et al., "Systems and Methods for Delivery of User-Controlled Resources in Cloud Environments Via a Resource Specification Language Wrapper", U.S. Appl. No. 12/790,294, filed May 28, 2010.

Ferris et al., "Systems and Methods for Managing Multi-Level Service Level Agreements in Cloud-Based Networks", U.S. Appl. No. 12/789,660, filed May 28, 2010.

Ferris et al., "Methods and Systems for Generating Cross-Mapping of Vendor Software in a Cloud Computing Environment", U.S. Appl. No. 12/790,527, filed May 28, 2010.

Ferris et al., "Methods and Systems for Cloud Deployment Analysis Featuring Relative Cloud Resource Importance", U.S. Appl. No. 12/790,366, filed May 28, 2010.

Ferris et al., "Systems and Methods for Generating Customized Build Options for Cloud Deployment Matching Usage Profile Against Cloud Infrastructure Options", U.S. Appl. No. 12/789,701, filed May 28, 2010.

Ferris et al., "Systems and Methods for Exporting Usage History Data as Input to a Management Platform of a Target Cloud-Based Network", U.S. Appl. No. 12/790,415, filed May 28, 2010.

Ferris et al., "Systems and Methods for Cross-Vendor Mapping Service in Cloud Networks", U.S. Appl. No. 12/790,162, filed May 28, 2010.

White Paper—"Best Practices for Building Virtual Appliances", 2008 rPath, Inc., www.rpath.com, 6 pages.

Ferris, "Systems and Methods for Multiple Cloud Marketplace Aggregation", U.S. Appl. No. 12/324,758, filed Nov. 26, 2008.

Ferris et al., "Systems and Methods for Identification and Management of Cloud-Based Virtual Machines", U.S. Appl. No. 12/128,768, filed May 29, 2008.

Ferris et al., "Methods and Systems for Managing Subscriptions for Cloud-Based Virtual Machines", U.S. Appl. No. 12/128,915, filed May 29, 2008.

Ferris, "Methods and Systems for Providing a Marketplace for Cloud-Based Networks", U.S. Appl. No. 12/130,929, filed May 30, 2008.

(56) References Cited

OTHER PUBLICATIONS

Ferris, "Systems and Methods for Management of Secure Data in Cloud-Based Network", U.S. Appl. No. 12/129,341, filed May 29, 2008.

Ferris et al., "Systems and Methods for Management of Virtual Appliances in Cloud-Based Network", U.S. Appl. No. 12/128,233, filed May 28, 2008.

Ferris, "Systems and Methods for Software Test Management in Cloud-Based Network", U.S. Appl. No. 12/127,940, filed May 28, 2008.

Ferris, "Methods and Systems for Load Balancing in Cloud-Based Networks", U.S. Appl. No. 12/127,926, filed May 28, 2008.

Ferris, "Methods and Systems for Automatic Self-Management of Virtual Machines in Cloud-Based Networks", U.S. Appl. No. 12/125,587, filed May 22, 2008.

Ferris "Methods and Systems for User Identity Management in Cloud-Based Networks", U.S. Appl. No. 12/127,102, filed May 27, 2008.

Ferris, "Methods and Systems for Optimizing Resource Usage for Cloud-Based Networks", U.S. Appl. No. 12/196,459, filed Aug. 22, 2008.

Williamson, "Systems and Methods for Promotion of Calculations to Cloud-Based Computation Resources", U.S. Appl. No. 12/200,281, filed Aug. 28, 2008.

Ferris, "Methods and Systems for Providing On-Demand Cloud-Computing Environments", U.S. Appl. No. 12/324,437, filed Nov. 26, 2008.

Ferris, "Methods and Systems for Providing Access Control to User-Controlled Resources in a Cloud Computing Environment", U.S. Appl. No. 12/324,621, filed Nov. 26, 2008.

Ferris, "Systems and Methods for Service Level Backup Using Re-Cloud Network", U.S. Appl. No. 12/324,803, filed Nov. 26, 2008.

Ferris, "Methods and Systems for Securing Appliances for Use in a Cloud Computing Environment", U.S. Appl. No. 12/324,563, filed Nov. 26, 2008.

Ferris, "Systems and Methods for Embedding a Cloud-Based Resource Request in a Specification Language Wrapper", U.S. Appl. No. 12/324,674, filed Nov. 26, 2008.

Ferris, "Methods and Systems for Providing a Market for User-Controlled Resources to be Provided to a Cloud Computing Environment", U.S. Appl. No. 12/390,617, filed Feb. 23, 2009.

Ferris et al., "Systems and Methods for Managing Third-Party Application Programming Interface in a Collaboration Space", U.S. Appl. No. 12/391,730, filed Feb. 24, 2009.

Ferris, "Methods and Systems for Communicating with Third Party Resources in a Cloud Computing Environment", U.S. Appl. No. 12/390,598, filed Feb. 23, 2009.

Ferris, "Systems and Methods for Extending Security Platforms to Cloud-Based Networks", U.S. Appl. No. 12/391,802, filed Feb. 24, 2009.

DeHaan et al., "Methods and Systems for Flexible Cloud Management", U.S. Appl. No. 12/473,041, filed May 27, 2009.

Ferris, "Methods and Systems for Providing a Universal Marketplace for Resources for Delivery to a Cloud Computing Environment", U.S. Appl. No. 12/475,228, filed May 29, 2009.

DeHaan et al., "Methods and Systems for Flexible Cloud Management with Power Management Support", U.S. Appl. No. 12/473,987, filed May 28, 2009.

DeHaan, "Methods and Systems for Automated Scaling of Cloud Computing Systems", U.S. Appl. No. 12/474,707, filed May 29, 2009.

DeHaan, "Methods and Systems for Securely Terminating Processes in a Cloud Computing Environment", U.S. Appl. No. 12/550,157, filed Aug. 28, 2009.

DeHaan, "Methods and Systems for Flexible Cloud Management Including External Clouds", U.S. Appl. No. 12/551,506, filed Aug. 31, 2009.

DeHaan, "Methods and Systems for Abstracting Cloud Management to Allow Communication Between Independently Controlled Clouds", U.S. Appl. No. 12/551,096, filed Aug. 31, 2009.

DeHaan, "Methods and Systems for Automated Migration of Cloud Processes to External Clouds", U.S. Appl. No. 12/551,459, filed Aug. 31, 2009.

Ferris, "Methods and Systems for Pricing Software Infrastructure for a Cloud Computing Environment", U.S. Appl. No. 12/551,517, filed Aug. 31, 2009.

Ferris et al., "Methods and Systems for Metering Software Infrastructure in a Cloud Computing Environment", U.S. Appl. No. 12/551,514, filed Aug. 31, 2009.

DeHaan et al., "Systems and Methods for Secure Distributed Storage", U.S. Appl. No. 12/610,081, filed Oct. 30, 2009.

Ferris et al., "Methods and Systems for Monitoring Cloud Computing Environment", U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

Ferris et al., "Methods and Systems for Verifying Software License Compliance in Cloud Computing Environments", U.S. Appl. No. 12/627,643, filed Nov. 30, 2009.

Ferris et al., "Systems and Methods for Service Aggregation Using Graduated Service Levels in a Cloud Network", U.S. Appl. No. 12/628,112, filed Nov. 30, 2009.

Ferris et al., "Methods and Systems for Generating a Software License Knowledge Base for Verifying Software License Compliance in Cloud Computing Environments", U.S. Appl. No. 12/628,156, filed Nov. 30, 2009.

Ferris et al., "Methods and Systems for Converting Standard Software Licenses for Use in Cloud Computing Environments", U.S. Appl. No. 12/714,099, filed Feb. 26, 2010.

Ferris et al., "Systems and Methods for Managing a Software Subscription in a Cloud Network", U.S. Appl. No. 12/714,096, filed Feb. 26, 2010.

Ferris et al., "Methods and Systems for Providing Deployment Architectures in Cloud Computing Environments", U.S. Appl. No. 12/714,427, filed Feb. 26, 2010.

Ferris et al., "Methods and Systems for Matching Resource Requests with Cloud Computing Environments", U.S. Appl. No. 12/714,113, filed Feb. 26, 2010.

Ferris et al., "Systems and Methods for Generating Cross-Cloud Computing Appliances", U.S. Appl. No. 12/714,315, filed Feb. 26, 2010.

Ferris et al., "Systems and Methods for Cloud-Based Brokerage Exchange of Software Entitlements", U.S. Appl. No. 12/714,302, filed Feb. 26, 2010.

Ferris et al., "Methods and Systems for Offering Additional License Terms During Conversion of Standard Software Licenses for Use in Cloud Computing Environments", U.S. Appl. No. 12/714,065, filed Feb. 26, 2010.

Ferris et al., "Systems and Methods for or a Usage Manager for Cross-Cloud Appliances", U.S. Appl. No. 12/714,334, filed Feb. 26, 2010.

Morgan, "Systems and Methods for Detecting Resource Consumption Events Over Sliding Intervals in Cloud-Based Network", U.S. Appl. No. 13/149,235, filed May 31, 2011.

Morgan, "Systems and Methods for Triggering Workload Movement Based on Policy Stack Having Multiple Selectable Inputs", U.S. Appl. No. 13/149,418, filed May 31, 2011.

Morgan, Systems and Methods for Cloud Deployment Engine for Selective Workload Migration or Federation Based on Workload Conditions, U.S. Appl. No. 13/117,937, filed May 27, 2011.

Morgan, "Systems and Methods for Tracking Cloud Installation Information Using Cloud-Aware Kernel of Operating System", U.S. Appl. No. 13/149,750, filed May 31, 2011.

Morgan, "Systems and Methods for Introspective Application Reporting to Facilitate Virtual Machine Movement Between Cloud Hosts", U.S. Appl. No. 13/118,009, filed May 27, 2011.

(56) References Cited

OTHER PUBLICATIONS

Morgan, "Systems and Methods for Self-Moving Operating System Installation in Cloud-Based Network", U.S. Appl. No. 13/149,877, filed May 31, 2011.
Morgan, "Systems and Methods for Generating Optimized Resource Consumption Periods for Multiple Users on Combined Basis", U.S. Appl. No. 13/037,359, filed Mar. 1, 2011.
Morgan, "Systems and Methods for Metering Cloud Resource Consumption Using Multiple Hierarchical Subscription Periods", U.S. Appl. No. 13/037,360, filed Mar. 1, 2011.
Morgan, "Systems and Methods for Generating Marketplace Brokerage Exchange of Excess Subscribed Resources Using Dynamic Subscription Periods", U.S. Appl. No. 13/037,351, filed Feb. 28, 2011.
Ferris et al., "Systems and Methods for Combinatorial Optimization of Multiple Resources Across a Set of Cloud-Based Networks", U.S. Appl. No. 12/953,718, filed Nov. 24, 2010.
Ferris et al., "Systems and Methods for Matching a Usage History to a New Cloud", U.S. Appl. No. 12/953,757, filed Nov. 24, 2010.
Ferris et al., "Systems and Methods for Identifying Usage Histories for Producing Optimized Cloud Utilization", U.S. Appl. No. 12/952,930, filed Nov. 23, 2010.
Ferris at al., "Systems and Methods for Identifying Service Dependencies in a Cloud Deployment", U.S. Appl. No. 12/952,857, filed Nov. 23, 2010.
Ferris at al., "Systems and Methods for Migrating Subscribed Services in a Cloud Deployment", U.S. Appl. No. 12/955,277, filed Nov. 29, 2010.
Ferris at al., "Systems and Methods for Migrating Subscribed Services from a Set of Clouds to a Second Set of Clouds", U.S. Appl. No. 12/957,281, filed Nov. 30, 2010.
Morgan, "Systems and Methods for Generating Mufti-Cloud Incremental Billing Capture and Administration", U.S. Appl. No. 12/954,323, filed Nov. 24, 2010.
Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.
Morgan, "Systems and Methods for Managing Subscribed Resource Limits in Cloud Network Using Variable or Instantaneous Consumption Tracking Periods", U.S. Appl. No. 12/954,352, filed Nov. 24, 2010.
Ferris et al., "Systems and Methods for Migrating Software Modules into One or More Clouds", U.S. Appl. No. 12/952,701, filed Nov. 23, 2010.
Ferris et al., "Systems and Methods for Brokering Optimized Resource Supply Costs in Host Cloud-Based Network Using Predictive Workloads", U.S. Appl. No. 12/957,274, filed Nov. 30, 2010.
Ferris at al., "Systems and Methods for Reclassifying Virtual Machines to Target Virtual Machines or Appliances Based on Code Analysis in a Cloud Environment", U.S. Appl. No. 12/957,267, filed Nov. 30, 2010.
Red Hat, Inc. Office Action for U.S. Appl. No. 12/040,831 dated Aug. 22, 2011.
USPTO; Office Action for U.S. Appl. No. 12/040,831 dated Jan. 24, 2012.
USPTO; Office Action for U.S. Appl. No. 12/040,831 dated Jul. 5, 2012.
USPTO; Office Action for U.S. Appl. No. 12/324,563 dated May 31, 2011.
USPTO; Final Office Action for U.S. Appl. No. 12/324,563 dated Jan. 18, 2012.
USPTO; Office Action for U.S. Appl. No. 12/551,517 dated Dec. 21, 2011.
USPTO;. Office Action for U.S. Appl. No. 12/551,517 dated Jul. 23, 2012.
Red Hat, Inc. Office Action for U.S. Appl. No. 12/040,831 dated Nov. 1, 2012.
Liu, Huan; "Rapid Application Configuration in Amazon Cloud using Configurable Virtual Appliances", 2011 ACM, SAC'11 Mar. 21-15, 2011, Taiwan, pp. 147-154; <http://d1.acm.org/citation.cfm?id+1982185.1982221&coll=DL&dl=GUIDE&CFID=268649706&CFTOKEN=27442775>.
Robison, D. "Billing simulation tool for commercial buildings;" Nov. 7, 2001; Fairmont Press Inc., Strategic Planning for Energy and the Environment, Fall 2001, vol. 21, No. 2, pp. 47-65.
VMware, "Best Practices for Building Virtual Appliances", 2007 VMware, Inc. pp. 1-7; <http://www.vmware.come/files/pdf/Best_Practices_Building_Virtual_Appliances.pdf>.
VMware, "User's Guide to Deploying vApps and Virtual Appliances", 2010 VMware, pp. 1-28; <http://www.vmware.com/support/developer/studio/studio21/va_user.pdf>.
VMware, "Virtual Appliances: A New Paradigm for Software Delivery," 2008 VMware, Inc., pp. 1-14; <http://www.vmware.com/files/pdf/vam/VMware_Virtual_Appliance_Solutions_White_Paper_08Q3.pdf>.
Weis et al., "Customizable Pervasive Application", 2006 IEEE, PERCOM'06, pp. 1-6; <http://ieeexplore.ieee.org/stamp/stamp.jsp?tp=&arnumber=1604813>.
USPTO, Office Action for U.S. Appl. No. 12/324,563 dated Jun. 18, 2013.
USPTO, Advisory Action for U.S. Appl. No. 12/324,563 dated Mar. 28, 2012.
USPTO, Final Office Action for U.S. Appl. No. 12/324,563 dated Jan. 9, 2014.
USPTO; Notice of Allowance for U.S. Appl. No. 12/551,517 dated Mar. 29, 2013.
USPTO, Advisory Action for U.S. Appl. No. 12/551,517 dated Oct. 11, 2012.
USPTO; Notice of Allowance for U.S. Appl. No. 12/040,831 dated Feb. 5, 2013.
"rBuilder 3.0 and rPath Appliance Platform Provide Revenue Growth and Channel Expansion Opportunities for ISVS", Feb. 12, 2007 rPath, Inc., www.rpath.com/corp/press-releases/2007-news/25-february-12-2007-rbuilder-30 . . . , 2 pages.
White Paper—"Best Practices for Building Virtual Appliances", Nov. 15, 2007, rPath, Inc., www.rpath.com, 8 pages.
Reimer, Darrell, et al., "Opening Black Boxes: Using Semantic Information to Combat Virtual Machine Image Sprawl," published in VEE'08 Proceedings of the fourth ACM SIGPLAN/SIGOPS international conference on Virtual execution environments, pp. 111-120, ACM New York, NY, USA © 2008, table of contents ISBN: 978-1-59593-796-4.
Gerla, Tim, Field Engineer, rPath, Inc. "From Application to Appliance Building Software Appliances with rPath's rBuilder," 15 pages, Apr. 14, 2008.
Healey, Matt; White Paper "Virtualizing Support", Mar. 2008, IDC, 9 pages. (was originally: White Paper—"rPath Versus Other Software Appliance Approaches", Mar. 2008, rPath, Inc., www.rpath.com, 9 pages.).

* cited by examiner

BUILDING CUSTOM APPLIANCES IN A CLOUD-BASED NETWORK

FIELD

This invention relates generally to products and services, more particularly, to systems and methods for cloud computing related services and products.

DESCRIPTION OF THE RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

When a user subscribes to a cloud, the user typically provides the software that to be executed by the virtual machines or utilizes pre-configured software available in the cloud. As such, the user must separately acquire and purchase their own software to be executed by the virtual machines or be limited to the pre-configured software. Thus, there is a need in the art for methods and system that allow a user to customize, on-demand, a software solution in a cloud.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
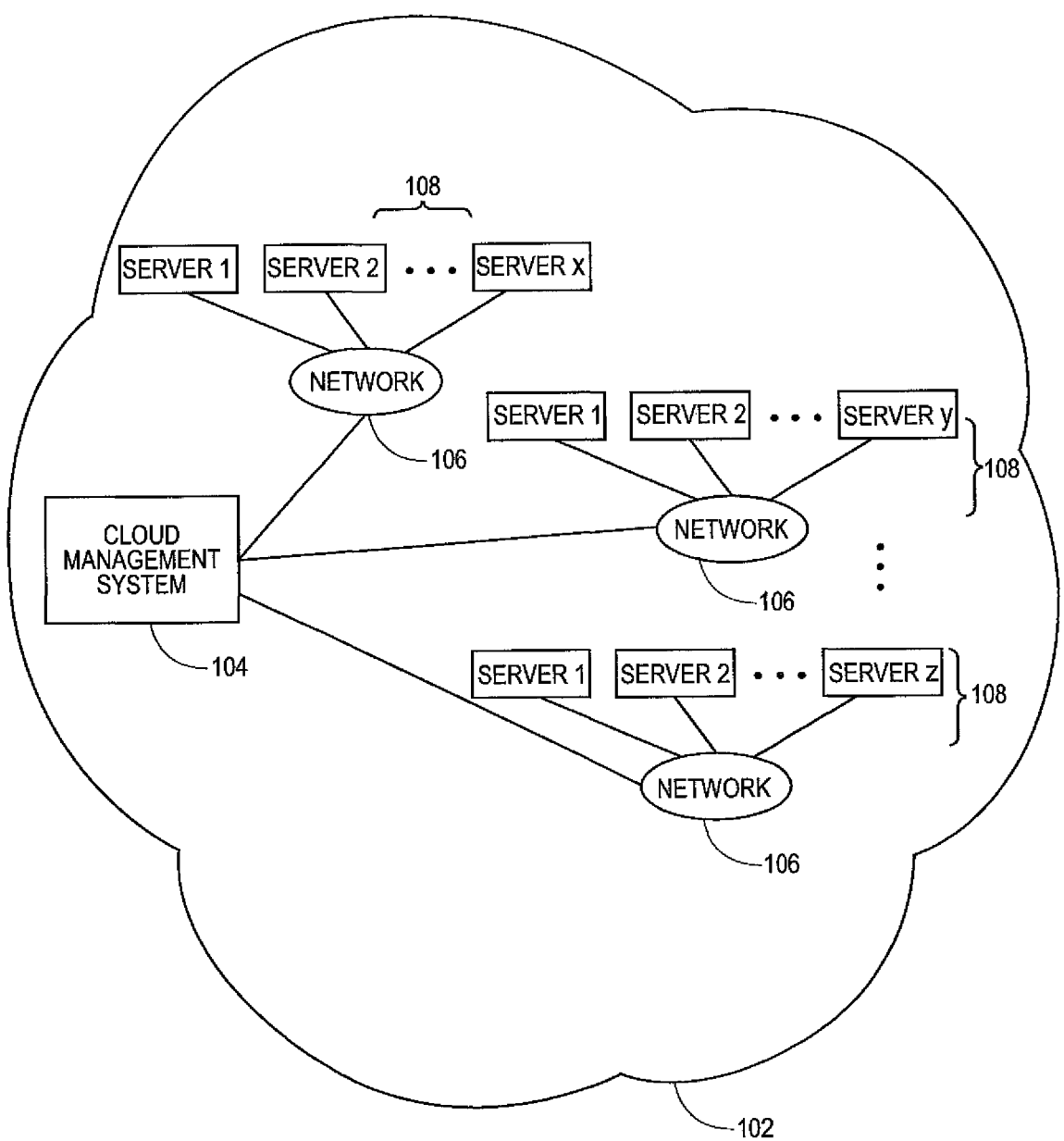
FIG. 1 illustrates an overall cloud system architecture in which various embodiments of the present teachings can be practiced.

For simplicity and illustrative purposes, the principles of the present invention are described by referring mainly to exemplary embodiments thereof. However, one of ordinary skill in the art would readily recognize that the same principles are equally applicable to, and can be implemented in, all types of information and service portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present teachings relate to systems and methods for providing custom appliances. More particularly, embodiments relate to platforms and techniques in which a cloud management system can enable a user to build, on-demand, a custom appliance from a repository software modules located in a cloud computing environment.

According to embodiments, in general, a user can request to build a custom appliance to be instantiated in a cloud computing environment. To provide the building service, the cloud management system can be configured to maintain a repository of software modules, which can be used to create the appliance. In response to the request, the cloud management system can be configured to provide a list of the available software modules to the user. The user can select the desired software modules and send the selection of software modules to the cloud management system. The user can also send configuration information to the cloud management system.

Once received, the cloud management system can build the custom appliance based on the user's request. The cloud management system can retrieve the selected software modules according to the request and construct the software modules according to the request. Once constructed, the cloud management system can be configured to instantiate the custom appliance in the cloud.

The cloud management system can also be configured to determine and bill the user for charges associated with building and instantiating the custom appliance. The charge can include a fee for building the appliance based on each software module included in the appliance. Likewise, the charge for building the appliance can be based on the instantiation of the custom appliance in the cloud computing environment, such as utilization of the custom appliance. To determine the charge, the cloud management system can maintain a list of rates for the software modules and instantiation of the custom appliance.

By providing the option of building an appliance, the user can construct a custom appliance, on-demand, without acquiring the software separately. Additionally, the cost to the user can be reduced by charging only for the cost of the appliance, as a whole, instantiated in the cloud and not for each individual component.

FIG. 1 illustrates an overall cloud computing environment, in systems and methods for the management of subscriptions of cloud-based virtual machines can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in set of resource servers 108 indicating a status regarding the provisioning of their respective resources. Various sets of resource servers can confirm, for example, the availability of a dedicated amount of processor cycles, amounts of electronic memory, communications bandwidth, or applications or other software prepared to be served.

Figure 2:
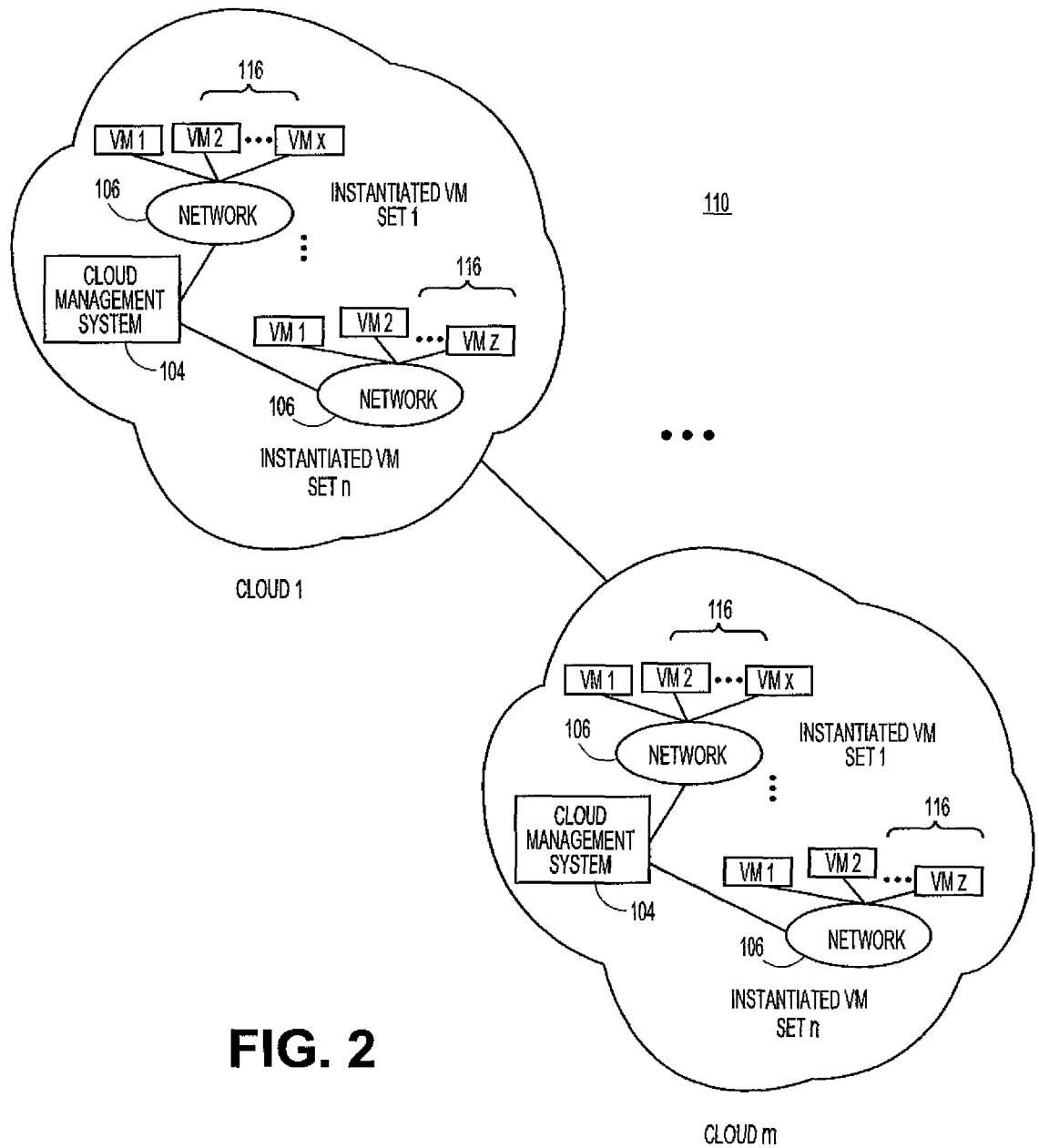
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other numbers of virtual machines to be made available to users on a network 114, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or delivery a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or her cloud 102. The cloud management system 104 of a first cloud 102 can interface with the cloud management system 104 of a second cloud 102, to coordinate those domains and operate the clouds and/or virtual machines or processes on a combined basis. The cloud management system. 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
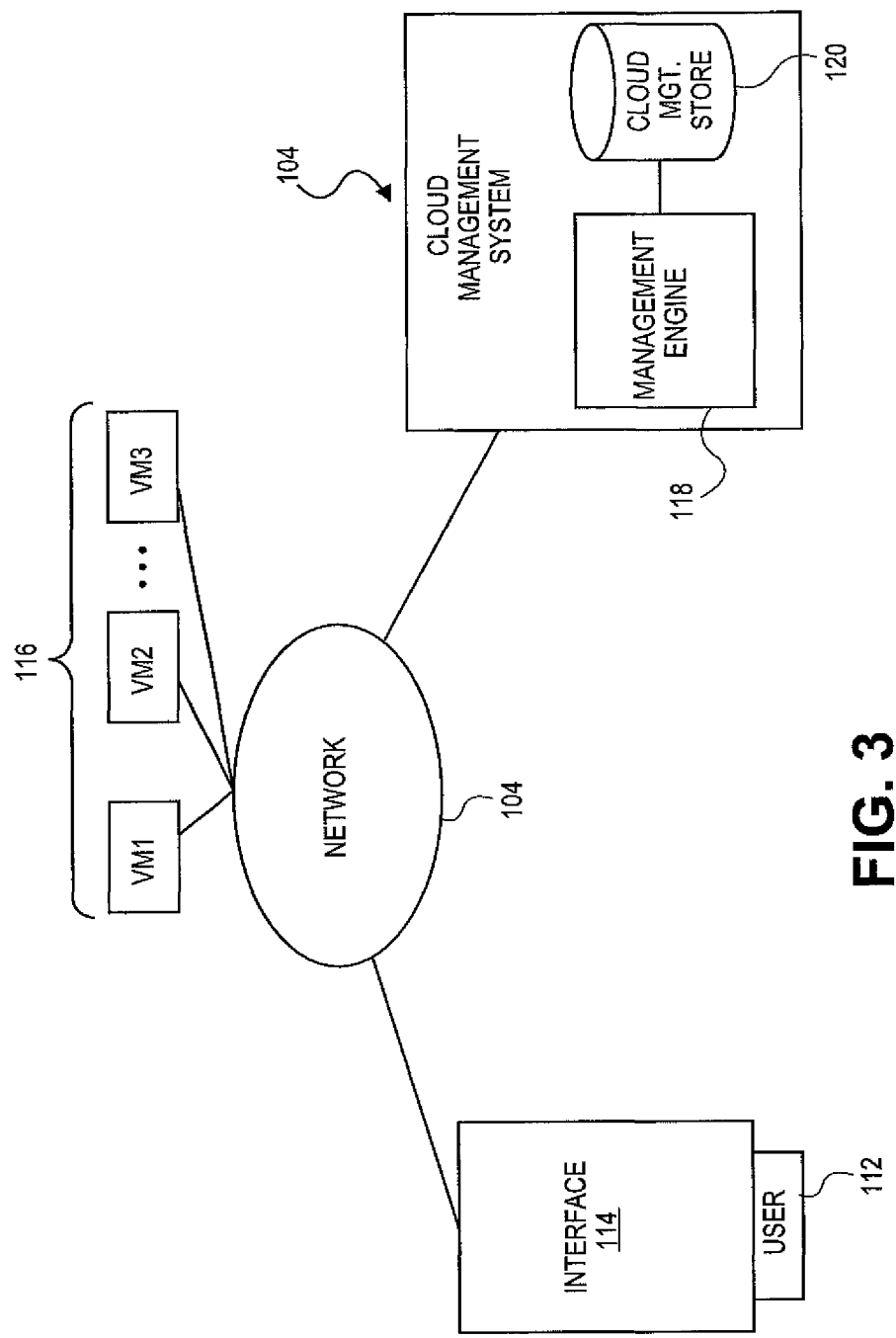
FIG. 3 illustrates a network configuration in which a cloud management system can build custom appliances, according to various embodiments.

FIG. 3 illustrates aspects of a cloud management system 104 and its management of virtual machines 116 of a cloud 102, according to various embodiments. In embodiments as shown, the cloud management system 104 can comprise a management engine 118 containing control logic for performing the processes of cloud management and a cloud management store 120. In embodiments as shown, the cloud management system 104 can be configured to build custom appliances according to a user 112 specifications.

In embodiments, the cloud management system 104 can be configured to maintain a repository of software modules. For example, the management engine 118 can be configured to maintain the repository in cloud management store 120. The software modules can be any type of software capable of executing on a computing platform. For example, the software modules can include operating systems and applications.

In embodiments, to allow users to build custom appliances, the cloud management system 104 can be configured to communicate with the user 112 in order to allow the user 112 to select software modules to be included in the custom appliance. The cloud management system 104 can be configured to communicate with the user 112 via an interface 114 to allow the user to request and provide specifications for the custom appliance. The interface 114 can be any type of interface to allow the user to communicate information to the cloud management system 104. For example, the interface 114 can be a specific graphical, command-line, or other interface generated by a program or application designed to communicate with the cloud management system 104. Likewise, the interface 114 can be an interface generated in conventional formats, such as .html, capable of being executed in network programs and applications, such as a web browser.

To select and configure the custom appliance, the management engine 118 can provide a list of available software modules, and the interface 114 can be configured to display the list. As such, the user 112 can select the software modules to be included in the custom appliance. For example, if the user desires to request a Web storefront, the user 112 can select an operating system and web site hosting application. In addition to selecting the software modules to include, the user 112 can specify configuration information for the custom appliance. The configuration information can be settings for the appliance that define how the custom appliance will function. For example, if the user requests an e-mail server, the user can specify the domain name of the server and email addresses associated with the server.

In addition, the cloud management system 104 can collect information from the user 112 in order to track the user's custom appliance. The cloud management system 104 can collect information such as identity, payment and billing information via interface 114.

Once the cloud management system 104 receives the specifications and configuration information for the custom appliance, the cloud management system 104 can be configured to build the custom appliance according to the user's specification. To build the custom appliance, the management engine 118 can retrieve the selected software modules from cloud management store 120. Once retrieved, the management engine 118 can combine the software modules and apply the user 112 configuration information in order to build the appliance. An appliance comprise one or more software modules combined with a "minimum amount of an operating system" (MiniOS) to allow the software modules to run on virtual machines executing in cloud 102. An appliance can be any type of software appliance such as those described in co-pending U.S. patent application Ser. No. 12/040,831 filed Feb. 29, 2008, entitled "METHODS AND SYSTEMS FOR DYNAMICALLY BUILDING A SOFTWARE APPLIANCE", the entirety of which is incorporated herein by reference.

Once built, the cloud management system 104 can instantiate the custom appliance in the virtual machines 116 or create a new set of virtual machines to support the custom appliance. The virtual machines 116 can be or include, for instance, a set of virtual servers that can support custom appliance.

As part of the process of building the custom appliance, the cloud management system 104 embed a management ID into each custom appliance. The management ID can be, for instance, a file, certificate, cookie, or other identification object encoding a unique identifier for that custom appliance. The incorporation of management ID into the custom appliance can permit cloud management system 104 to directly configure, manage, store and track the custom appliance.

After building, the cloud management system 104 can determine a charge for the building and/or instantiating the custom appliance in cloud 102. The charge for building the appliance can be based on an individual charge for each software module included in the custom appliance.

Additionally, the cloud management system 104 can base the charge for the custom appliance on the instantiation of the custom appliance in the cloud 102. As such, the cloud management system 104 can track the utilization of the custom appliance in order to determine the charge. For example, the management engine 118 can track such data as the duration the custom appliance is instantiated in the cloud 102, the time period that the custom appliance is instantiated (peak or off-peak times), and the computing resources consumed by the custom appliance (number of resource servers, computing cycles, bandwidth, memory usage, storage usage). To track the usage, the management engine 128 can communicate with the cloud 102 via network 106 to monitor the virtual machines 116.

For the instantiation charge, the cloud management system 104 can determine a fee or charge for the virtual machines 116 instantiated in the cloud 102 based on the tracked usage. For example, the cloud management system 104 can base the fee for each individual virtual machines 116 on the instantiation time, such as hours instantiated, of each virtual machine 116. Additionally, the cloud management system 104 can base the fee of the amount of resources utilized by each individual virtual machine 116. For example, the cloud management system 104 can base the fees on computing resources, for instance computer cycles, bandwidth, memory utilization, storage utilization, consumed by a virtual machine 116. Likewise, the cloud management system 104 can base the fee on a combination of instantiation time and consumed computing resources.

Additionally, the cloud management system 104 can base the fees charged on the time period in which the each virtual machine 116 is instantiated. For example, the cloud management system can charge different rates for peak time periods (e.g. time periods when the cloud 102 is heavily utilized) and off-peak time periods. Likewise, the cloud management system 104 can base the fee on a combination of the tracked time period, the tracked instantiation time and the consumed computing resources.

In order to determine the charge, in embodiments, the cloud management system 104 can maintain a list of rates for individual components, the various usages, such as instantiation duration, computing resources consumed, and instantiation time period. Additionally, the cloud management system 104 can maintain a list of discounts available based on the usage of the cloud 102. For example, the cloud management system 104 can maintain a list of discounts for volume usage of the cloud computing environment or reduced rates based on the amount of usage by the user. The cloud management system 104 can maintain the list of rates and discounts in cloud management store 126. To determine the fees, the cloud management system 104 can retrieve the list of rates and calculate the charges based on the individual components or the tracked usage.

In embodiments, the cloud management system 104 can bill the user 112 for the charges associated with building and/or instantiating the virtual appliance. The cloud management system 104 can initiate a payment process, via any electronic or physical payment process, for the extracted fees. For example, the management engine 118 can generate a bill to be transmitted to user 112 or can initiate automatic payment if the user 112 has provided payment information. The cloud management system 104 can perform the billing process on-demand or in a periodic manner.

Figure 4:
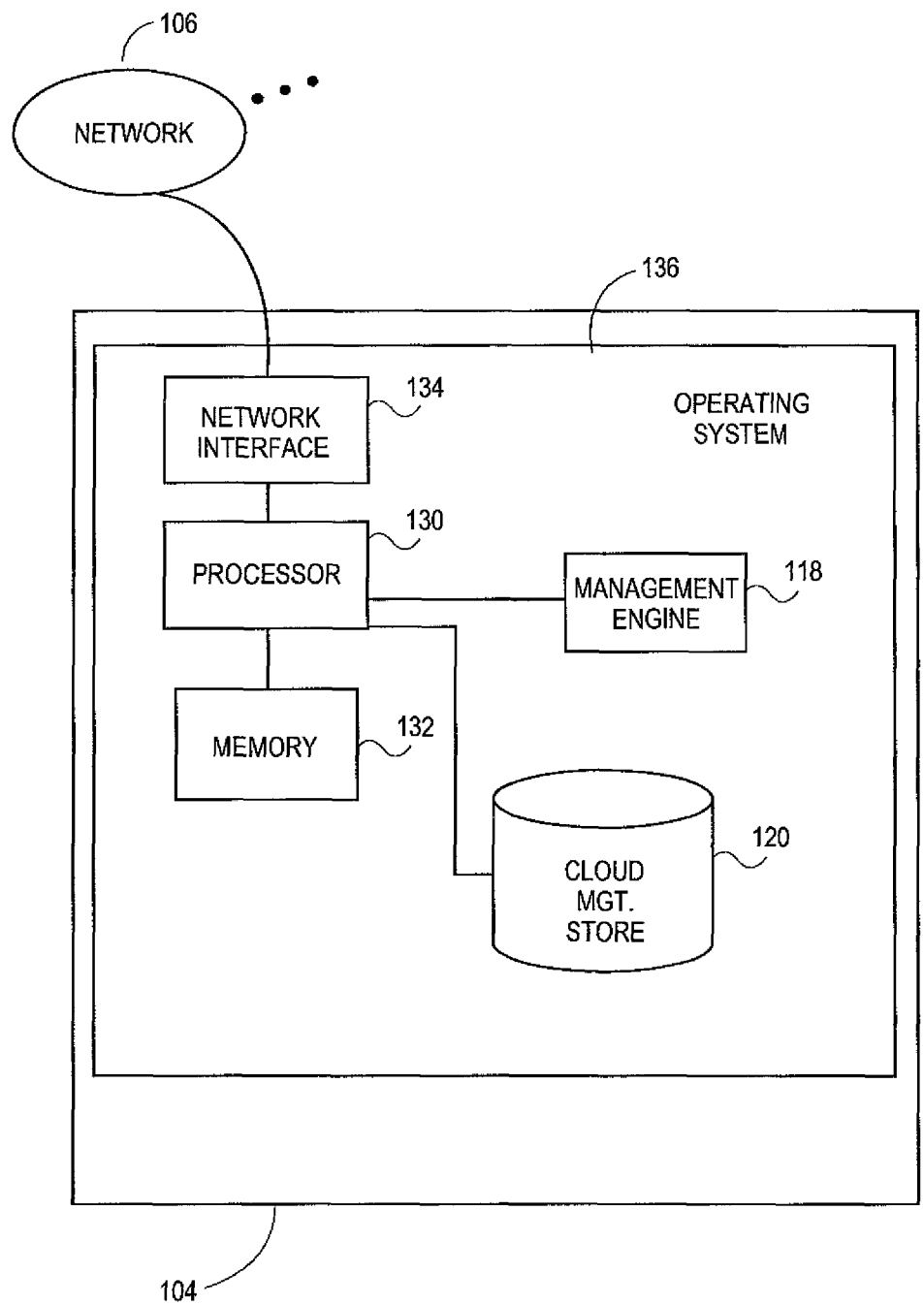
FIG. 4 illustrates an exemplary hardware configuration for a cloud management system, according to various embodiments.

FIG. 4 illustrates an exemplary diagram of hardware and other resources that can be incorporated in a cloud management system 104 configured to communicate with instantiated virtual machines 116 and the user 112 via one or more networks 106, according to embodiments. In embodiments as shown, cloud management system 104 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with cloud management store 126, such as a database stored on a local hard drive. Processor 130 further communicates with network interface 134, such as an Ethernet or wireless data connection, which in turn communicates with one or more networks 106, such as the Internet or other public or private networks. Processor 138 also communicates with cloud management store 120 and management engine 118, to execute control logic and control the operation of virtual machines and other resources in cloud 102. Other configurations of cloud management system 104, associated network connections, and other hardware and software resources are possible.

Figure 5:
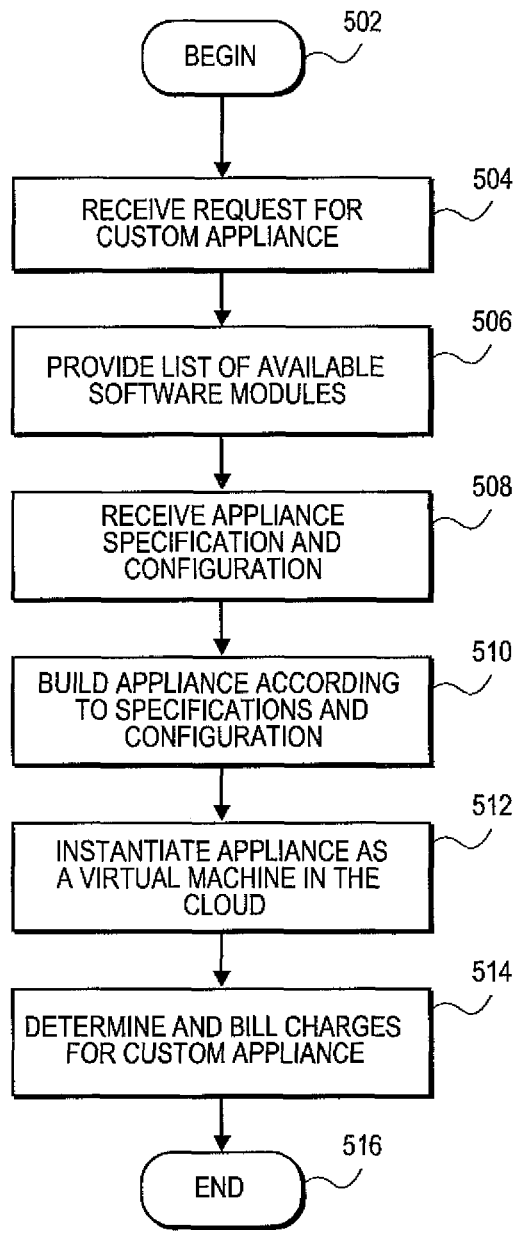
FIG. 5 illustrates a flowchart for custom appliance building in a cloud computing environment, according to various embodiments.

FIG. 5 illustrates a flow diagram of overall appliance building in a cloud environment, according to embodiments of the present teachings. In 502, processing can begin. In 504, cloud management system 104 can receive a request to build a custom appliance. The request can be received from a customer, administrator, or other user.

In 506, the cloud management system 104 can provide a list of available software modules to the user. In 508, the cloud management system 104 can receive the user's specification and configuration information for the custom appliance. This can include the software modules selected by the user and configuration information for the completed appliance.

Then, in 510, the cloud management system 104 can build the appliance based on the user's specification and configuration information. For example, the cloud management system 104 can retrieve the selected software modules and combine the software modules. Then, in 512, the cloud management system 104 can instantiate the custom appliance in the cloud 102.

After building, in 514, the cloud management system 104 can determine and bill the user for the charges associated with the custom appliance. The cloud management system 104 can perform the billing process on-demand or in a periodic manner.

Then, in 518, if the cloud 102 terminates, the process can end, but the process can return to any point and repeat.

In the foregoing and other embodiments, the user making an instantiation request or otherwise accessing the cloud network can be a person, customer, subscriber, corporation, organization, or other entity. In embodiments, the user can be or include another virtual machine, application or process. In further embodiments, multiple users or entities can share the use of a set of virtual machines or other resources.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:

receiving a request to build a software appliance, the request comprising a set of software modules from a repository of software modules to be included in the software appliance and an indication of a period of time for utilization of the software appliance;

determining, by a processor, a minimum amount of an operating system necessary to allow the set of software modules to run on one or more sets of virtual machines in a cloud computing environment, wherein the minimum amount of the operating system comprises a subset of a complete operating system, the subset sufficient to support the set of software modules, and wherein the minimum amount of the operating system provides a set of reduced features and components required to provide an application space for the set of software modules;

configuring the software appliance in view of the request, wherein the software appliance comprises the set of software modules and the minimum amount of the operating system, and wherein configuring the software appliance comprises embedding a management identifier into the software appliance, the management identifier to permit tracking of the software appliance;

identifying a set of resource servers hosted in the cloud computing environment that are available during the period of time specified in the request;

creating the one or more sets of virtual machines using the set of resource servers hosted in the cloud computing environment to support the software appliance, the one or more sets of virtual machines comprising a first set of virtual machines running on a first partition of the set of resources servers and a second set of virtual machines running on a second partition of the set of resource servers, wherein the first partition and the second partition are isolated to support a multi-tenant cloud arrangement;

instantiating the software appliance on the one or more sets of virtual machines using the minimum amount of the operating system during the period of time specified in the request; and tracking a utilization of the software appliance, including a duration for which the software appliance is instantiated, the period of time during which the software appliance is instantiated, and an amount of resources consumed by the software appliance, in order to determine a charge, wherein the charge is determined in view of the duration, the period of time and the amount of resources consumed.

2. The method of claim 1, further comprising: determining a charge associated with building the software appliance.

3. The method of claim 2, wherein the charge is in view of at least one of a charge for the set of software modules or a charge for instantiation of the software appliance.

4. The method of claim 3, wherein the charge for instantiation of the software appliance is in view of at least one of a time period for the software appliance, a duration of the software appliance, or a resource usage of the software appliance.

5. The method of claim 1, wherein the set of the software modules comprises at least one of the operating system and an application.

6. The method of claim 1, wherein receiving the request comprises receiving configuration information for the software appliance.

7. The method of claim 1, wherein the cloud computing environment comprises a set of resource servers to deliver resources to instantiate the software appliance.

8. A system comprising:
a network interface to at least one virtual machine in a cloud computing environment; and
a processor to communicate with memory to execute a cloud management module, the processor to:
receive a request to build a software appliance, the request comprising a set of the software modules from a repository of software modules to be included in the software appliance and an indication of a period of time for utilization of the software appliance;
determine a minimum amount of an operating system necessary to allow the set of software modules to run on one or more sets of virtual machines in a cloud computing environment, wherein the minimum amount of the operating system comprises a subset of a complete operating system, the subset sufficient to support the set of software modules, and wherein the minimum amount of the operating system provides a set of reduced features and components required to provide an application space for the set of software modules;
build the software appliance in view of the request, wherein the software appliance comprises the set of software modules and the minimum amount of the operating system, and wherein building the software appliance comprises embedding a management identifier into the software appliance, the management identifier to permit tracking of the software appliance;
identify a set of resource servers hosted in the cloud computing environment that are available during the period of time specified in the request;
create the one or more sets of virtual machines using the set of resource servers hosted in the cloud computing environment to support the software appliance, the one or more sets of virtual machines comprising a first set of virtual machines running on a first partition of the set of resources servers and a second set of virtual machines running on a second partition of the set of resource servers, wherein the first partition and the second partition are isolated to support a multi-tenant cloud arrangement;
instantiate the software appliance on the one or more sets of virtual machines during the period of time specified in the request; and
track a utilization of the software appliance, including a duration for which the software appliance is instantiated, the period of time during which the software appliance is instantiated, and an amount of resources consumed by the software appliance, in order to determine a charge, wherein the charge is determined in view of the duration, the period of time and the amount of resources consumed.

9. The system of claim 8, the processor further to: determine a charge associated with building the software appliance.

10. The system of claim 9, wherein the charge is in view of at least one of a charge for the set of software modules or a charge for instantiation of the software appliance.

11. The system of claim 10, wherein the charge for instantiation of the software appliance is in view of at least one of a time period for the software appliance, a duration of the software appliance, or a resource usage of the software appliance.

12. The system of claim 8, wherein the set of the software modules comprises at least one of the operating system and an application.

13. The system of claim 8, wherein receiving to receive the request, the processor further to:
receive configuration information for the software appliance.

14. The system of claim 8, wherein the cloud computing environment comprises a set of resource servers to deliver resources to instantiate the software appliance.

15. A non-transitory computer readable storage medium, storing instructions which when executed, cause a processor to:
receive a request to build a software appliance, the request comprising a set of software modules from a repository of software modules to be included in the software appliance and an indication of a period of time for utilization of the software appliance;
determine, by the processor, a minimum amount of an operating system necessary to allow the set of software modules to run on one or more sets of virtual machines in a cloud computing environment, wherein the minimum amount of the operating system comprises a subset of a complete operating system, the subset sufficient to support the set of software modules, and wherein the minimum amount of the operating system provides a set of reduced features and components required to provide an application space for the set of software modules;

build the software appliance in view of the request, wherein the software appliance comprises the set of software modules and the minimum amount of the operating system, and wherein to build the software appliance the instructions to cause the processing device to embed a management identifier into the software appliance, the management identifier to permit tracking of the software appliance;

identify a set of resource servers hosted in the cloud computing environment that are available during the period of time specified in the request;

create the one or more sets of virtual machines using the set of resource servers hosted in the cloud computing environment to support the software appliance, the one or more sets of virtual machines comprising a first set of virtual machines running on a first partition of the set of resources servers and a second set of virtual machines running on a second partition of the set of resource servers, wherein the first partition and the second partition are isolated to support a multi-tenant cloud arrangement;

instantiating the software appliance on the one or more sets of virtual machines during the period of time specified in the request; and track a utilization of the software appliance, including a duration for which the software appliance is instantiated, the period of time during which the software appliance is instantiated, and an amount of resources consumed by the software appliance, in order to determine a charge, wherein the charge is determined in view of the duration, the period of time and the amount of resources consumed.

16. The non-transitory computer readable medium of claim 15, the instructions to further cause the processing device to:

determine a charge associated with building the software appliance.

17. The non-transitory computer readable medium of claim 16, wherein the charge is in view of at least one of a charge for the set of software modules or a charge for instantiation of the software appliance.

18. The non-transitory computer readable medium of claim 17, wherein the charge for instantiation of the software appliance is in view of at least one of a time period for the software appliance, a duration of the software appliance, or a resource usage of the software appliance.

19. The non-transitory computer readable medium of claim 15, wherein the set of the software modules comprises at least one of the operating system and an application.

20. The non-transitory computer readable medium of claim 15, wherein to receive the request the instructions to cause the processing device to:

receive configuration information for the software appliance.

21. The non-transitory computer readable medium of claim 15, wherein the cloud computing environment comprises a set of resource servers to deliver resources to instantiate the software appliance.

* * * * *